United States Patent [19]
Shioya et al.

[11] Patent Number: 5,362,144
[45] Date of Patent: Nov. 8, 1994

[54] SYSTEM FOR MOVING A TELEVISION SET MOUNTED ON A MOTOR VEHICLE

[75] Inventors: Yuichiro Shioya; Hidenori Kitazawa; Kouichi Miyano; Kouji Takano; Keigo Nagai; Takashi Yamaguchi; Yoshio Minamide; Masashi Kawamoto; Masaaki Watanabe, all of Saitama, Japan

[73] Assignee: Pioneer Electronic Corporation, Tokyo, Japan

[21] Appl. No.: 40

[22] Filed: Jan. 4, 1993

[30] Foreign Application Priority Data

| Jan. 8, 1992 | [JP] | Japan | 4-019518 |
| Jan. 8, 1992 | [JP] | Japan | 4-019519 |
| Jan. 13, 1992 | [JP] | Japan | 4-023199 |
| Jan. 13, 1992 | [JP] | Japan | 4-023200 |

[51] Int. Cl.$^5$ .................. A47B 88/00; A47B 77/08
[52] U.S. Cl. .................. 312/319.6; 312/223.1; 312/7.2
[58] Field of Search ........... 312/319.6, 319.7, 223.1, 312/7.1-7.2, 8.12, 8.15, 9.1, 9.15, 9.26; 364/424-425; 318/467, 466, 434; 340/905, 988, 990, 994

[56] References Cited

U.S. PATENT DOCUMENTS

| 4,204,255 | 5/1980 | Cremer | 364/425 |
| 4,661,752 | 4/1987 | Nishikawa et al. | 364/424 X |
| 4,707,788 | 11/1987 | Tashiro et al. | 318/466 X |
| 4,775,939 | 10/1988 | Nakashima et al. | 364/425 X |
| 4,843,477 | 6/1989 | Mizutani et al. | 312/7.2 X |
| 4,937,570 | 6/1990 | Matsukawa et al. | 340/905 |
| 5,177,730 | 1/1993 | Utsugi | 369/75.1 |

FOREIGN PATENT DOCUMENTS 2-31577  2/1990  Japan .

Primary Examiner—James R. Brittain
Assistant Examiner—Nancy Mulcare
Attorney, Agent, or Firm—Nikaido, Marmelstein, Murray & Oram

[57] ABSTRACT

A system for moving a television set has a carrier slidably mounted in a casing. The television set is pivotally mounted in the carrier at a front portion of the carrier. A carrier driving motor and a television set rotating motor are provided. A memory is provided for storing positions of the carrier and an angular position of the television set. A control unit is provided for controlling the carrier driving motor and the television set rotating motor in accordance with the positions stored in the memory for moving the carrier between a forward position and a backward position in the casing and for rotating the television set between a downward position and a standing position. Thus the television set is moved between a retracted position in the casing and the standing position outside the casing.

7 Claims, 11 Drawing Sheets

SYSTEM FOR MOVING A TELEVISION SET MOUNTED ON A MOTOR VEHICLE

FIELD OF THE INVENTION

The present invention relates to a television set mounted in a dashboard of a motor vehicle, and more particularly to a system for positioning the television set in a posture suitable for watching.

BACKGROUND OF THE INVENTION

A television set is mounted on a motor vehicle for receiving television broadcasts, replaying a video tape, or displaying a road map and traffic information. Due to the limited space in the vehicle, the television set is provided with a thin LCD (liquid crystal display) rather than a bulky CRT display. The television set is mounted on an exclusive support member in a dashboard of the vehicle, or on support arms projecting from the dashboard toward a shift lever. However, the television set thus disposed is liable to be heated by exposure to the sun, thereby deforming the LCD, and/or deteriorating the display functions of the television set.

In order to protect the television set from heat, Japanese Patent Application Laid-Open 2-31577 discloses an LCD television set mounted in a dashboard of the vehicle as shown in FIGS. 14 to 16. A television set 1 is pivotally mounted on a carrier 3 through a support member (not shown) provided at a lower end of the television set 1, and the carrier 3 is slidably mounted in a casing 2 provided in a dashboard D.

The television set 1 and the carrier 3 are disposed horizontally in the casing 2. The television set 1 is manually pulled out of the casing 2 as shown in FIG. 15, and rotated a desired angle about a pivot of the support member, so that the LCD of the television set 1 is angularly disposed in a posture suitable for watching. In order to store the television set 1 in the casing 2, the set is manually rendered flat and pushed back into the casing 2. If an electrically operated driving mechanism is provided in the carrier 3, the television set 1 is automatically drawn out and returned into the casing 2 upon the operation of the buttons. Since the television set 1 is thus housed in the casing 2 in the dashboard D when not in use, the LCD is protected from heat.

In such a device, the television set must be set in a proper angular posture at every use. This is troublesome for the driver of the motor vehicle, particularly when setting the television set while driving of the vehicle.

If the television set is left ejected during the parking of the vehicle, and the television set is exposed to the sun, the LCD can be deteriorated Furthermore, the television set supported only by the carrier is liable to vibrate during the driving of the vehicle, which may render the television image difficult to watch. In addition, when a push button on the television set is depressed, the set is pushed back, which decreases the operability of the set.

There can occur further trouble when the television set is ejected, because it contacts with a shift lever of the vehicle, according to the kind of vehicle used.

SUMMARY OF THE INVENTION

An object of the present invention is to eliminate above described defects of the conventional television set.

According to the present invention, there is provided a system for moving a television set mounted on a motor vehicle having an inside wall member, comprising a casing having an opening and provided in the inside wall member of the motor vehicle, a carrier slidably mounted in the casing so as to be moved toward the opening, supporting means provided on the carrier for pivotally mounting the television set at a front portion of the carrier, a carrier driving motor for driving the carrier in the casing, and a television set rotating motor for pivotally rotating the television set. The system has following means, such as first transmitting means for transmitting the output power of the carrier driving motor to the carrier so as to drive the carrier, second transmitting means for transmitting the output power of the television set rotating motor so as to rotate the motor, memory means for storing positions of the carrier and an angular position of the television set, control means for controlling the carrier driving motor and the television set rotating motor by using the positions stored in the memory means for moving the carrier between a forward position and a backward position in the casing and for rotating the television set between a downward position and a standing position, so that the television set is moved between a retracted position in the casing and the standing position outside the casing.

In one feature of the invention, the memory means has means for selectively storing the standing position, and the control means has means for rotating the television set to the stored standing position, and means responsive to turning off of an accessory switch of the motor vehicle for moving the television set from the standing position to the retracted position.

The other objects and features of this invention will become understood from following description with reference to the accompanying drawings.

DETAILED DESCRIPTION OF THE PREFERRED EMBODIMENTS

Referring to FIGS. 1 to 4, a television set 20 according to the present invention is housed in a casing 10 mounted in a dashboard D (FIG. 8) of an automobile. The casing 10 has dimensions in accordance with the DIN (Deutsche Industrie Norm). The television set 20 is adapted to be ejected from the casing 10 passing through an opening 13 when a start switch (not shown) is depressed and to be retracted into the casing 10 when the ignition switch of the vehicle is turned off.

The television set 20 has an LCD 21 which is positioned downward when stored in the casing 10, and a plurality of push buttons (not shown) on a front panel thereof for tuning and controlling the volume, brightness and other characteristics of the television set 20. The rear edge 23a of the housing of the television set is curved in order to enable the television set to be rotated before the television set is completely ejected out of the casing 10, as will be described later.

Figure 3:
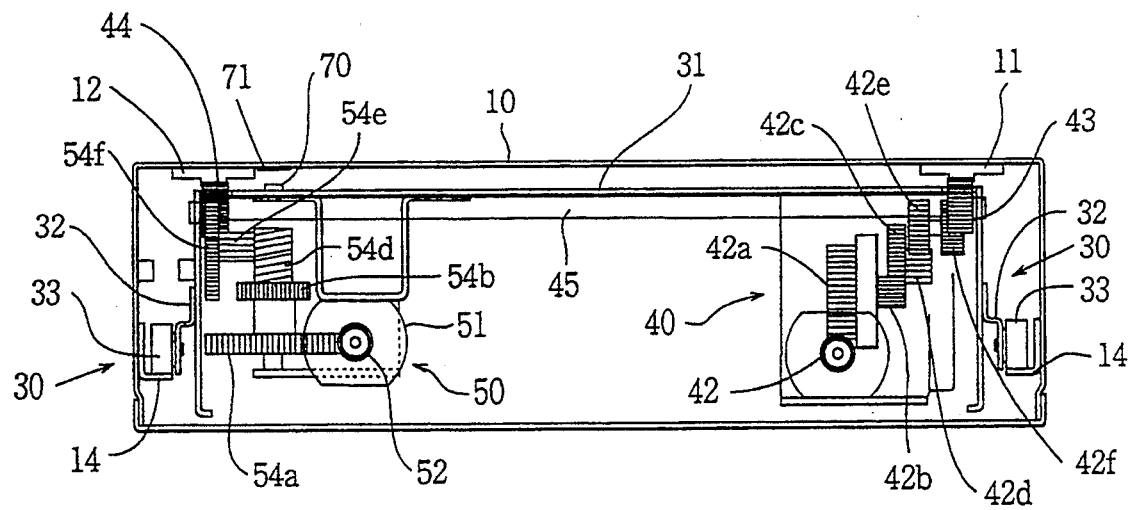
FIG. 3 is an elevation of the television set and the carrier as viewed from the rear thereof.

Referring to FIG. 3, on both longitudinal sides of the carrier 31, there is provided a supporting device 30 for supporting the carrier 31 on the casing 10. The carrier 31 houses a driving mechanism 40 for moving the carrier 31, and hence the television set 20, in and out of the casing 10, and a rotating mechanism 50 for pivotally rotating the television set 20 to a position where the LCD 21 faces the viewer when the television set 20 is out of the casing 10.

The supporting device 30 comprises a pair of rollers 33, each of which is rotatably mounted on the side wall of the carrier 31 through a longitudinally extending supporting member 32. Each roller 33 rolls on an L-shaped guide member 14 which is attached on the opposite longitudinal inner walls of the casing 10. Thus, the carrier 31 can be moved in the horizontal direction in the casing 10.

Figure 1:
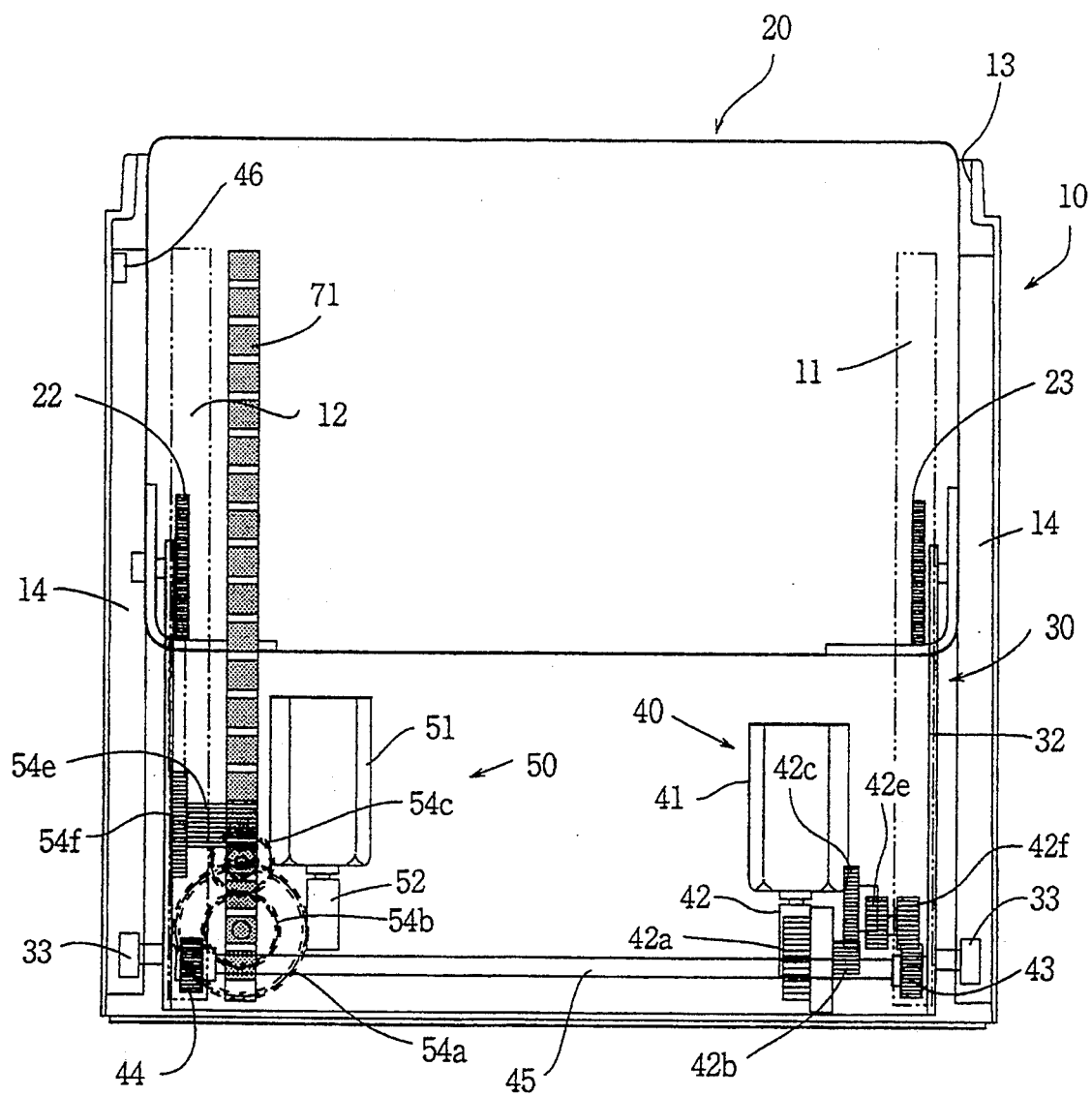
FIG. 1 shows a television set and a carrier thereof mounted on a motor vehicle according to the present invention in plan view.
Figure 2:
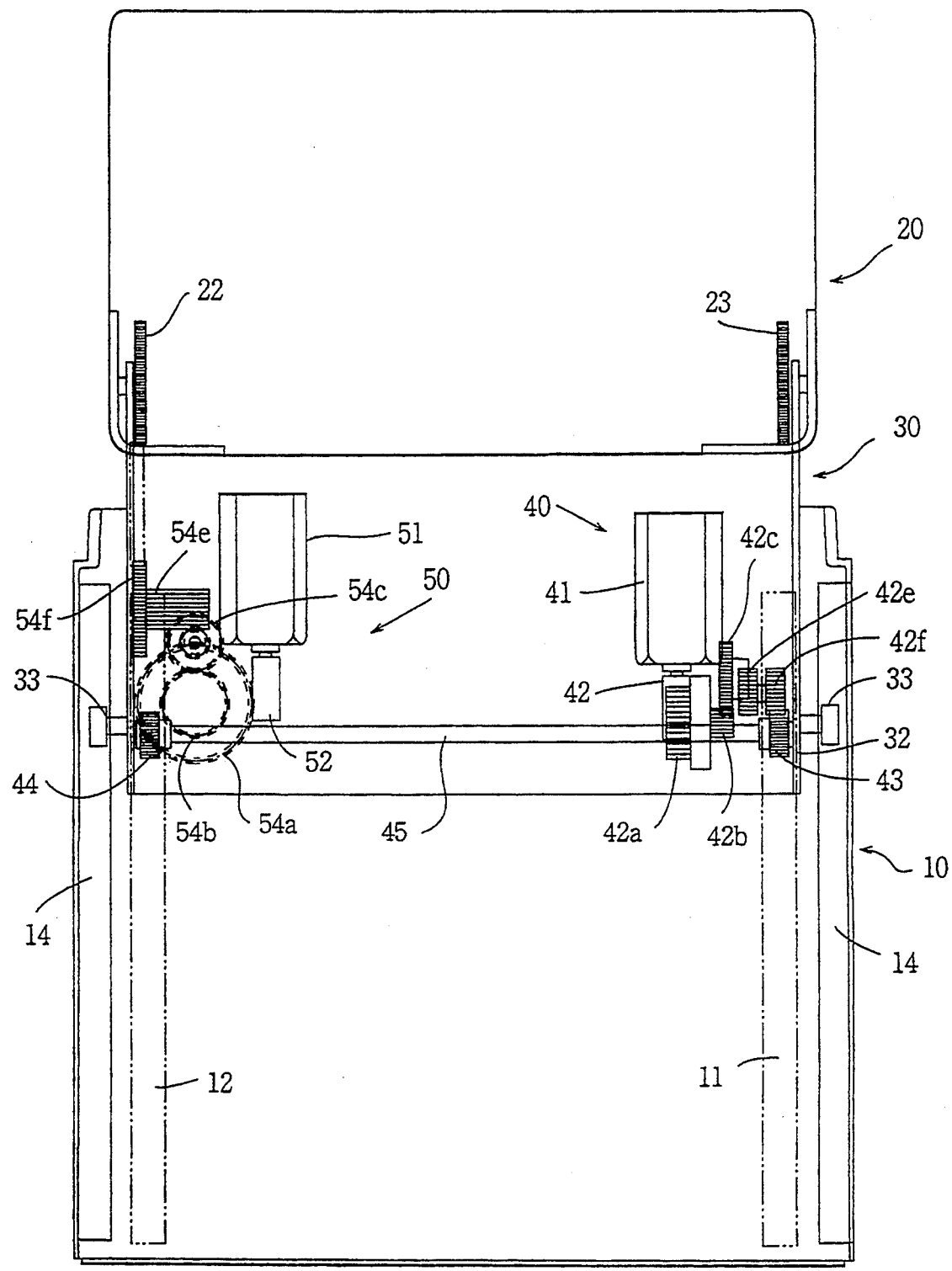
FIG. 2 shows the television set and the carrier as viewed from the underside thereof.

As shown in FIGS. 1 and 3, the driving mechanism 40 has a carrier driving motor 41 to drive the carrier 31. A pinion 43 is securely mounted on an end of a shaft 45 which is laterally mounted in an upper rear end portion of the carrier 31, and a pinion 44 is securely mounted on the other end of the shaft 45. The pinions 43 and 44 are engaged with racks 11 and 12, respectively, which are mounted on the underside of the casing 10 in parallel with each other. The motor 41 is operatively connected to the pinion 43 through a gear train comprising a worm 42, worm wheel 42a, and gears 42b, 42c, 42d, 42e and 42f. Hence, when the motor 41 is driven, the pinions 43 and 44 are rotated. Thus the carrier 31 is moved in the casing 10, while being supported by the rollers 33. There is provided a slipping mechanism in the gear train so as to slip adjacent power transmitting members, so that the motor and the gear train are prevented from breaking when the television set is stopped as described hereinafter.

On one side of the upper surface of the carrier 31 is provided a photosensor 70. At a position facing the photosensor 70, an optical horizontal tape 71 having a plurality of alternate black stripes and white stripes is adhered on the inner upper surface of the casing 10 as shown in FIG. 1. A beam which is emitted from the photosensor 70 is reflected on the white stripe, thereby generating pulse signals. Thus, as the carrier 31 travels in the casing 10, the photosensor 70 detects the traveling length thereof.

A mechanical sensing switch 46 is mounted on the inner side wall of the casing 10 adjacent the opening 13 thereof as shown in FIG. 1. The sensing switch 46 is turned on by a projection (not shown) which is projected from the side wall of the casing 31 at a front portion thereof. Thus, it is possible to determine the position where the television set 20 is sufficiently projected out of the casing 10 so as to be enabled to be rotated. A photosensor may be provided instead of the mechanical sensing switch 46. Alternatively, the desired position for starting the rotation of the television set 20 may be determined by detecting the traveling length of the carrier 31 using the photosensor 70.

Figure 4:
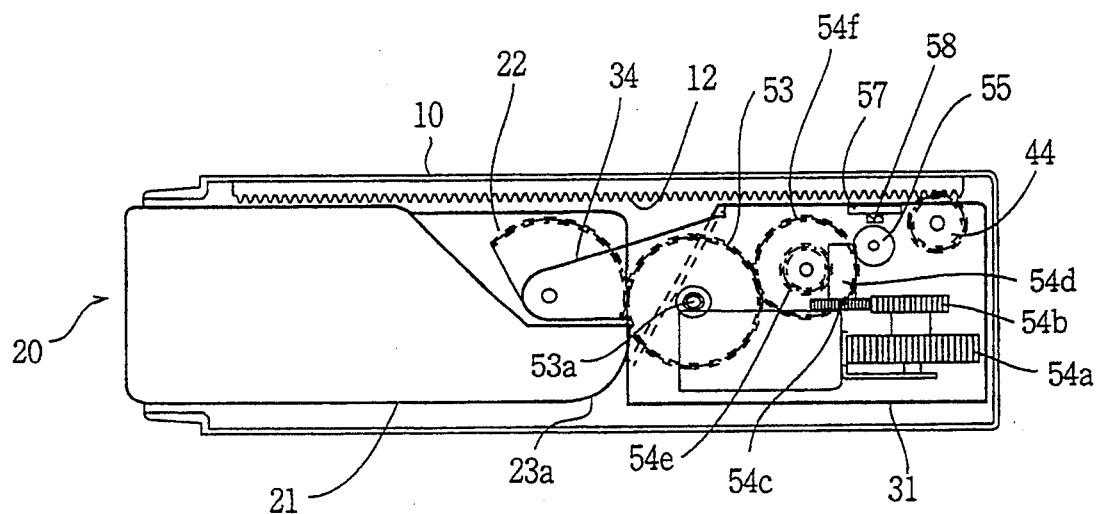
FIG. 4 is a side view of the television set and the carrier.

As shown in FIGS. 1, 3 and 4, the rotating mechanism 50 has a television set rotating motor 51 for pivotally rotating the television set 20. A pair of gears 53 are securely mounted on either end of a shaft 53a which is rotatably mounted in the carrier 31 adjacent the television set. The motor 51 is operatively connected with the gears 53 through a gear train comprising a worm 52, worm wheel 52a, gears 54b, 54c, a worm 54d, a worm wheel 54e and a gear 54f. The gears 53 are engaged with sector gears 22 and 23, respectively, which are securely mounted on the television set 20. When the motor 51 is driven, the gears 53 are rotated, thereby rotating the respective gears 22 and 23. Consequently, the television set 20 is rotated to position the LCD 21 at a desired angle.

Figure 5:
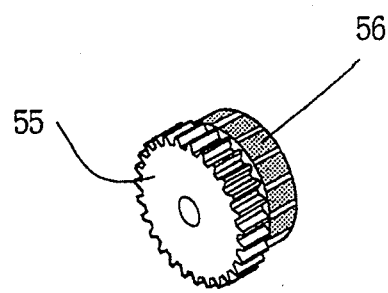
FIG. 5 is a perspective view of a gear and an optical wheel of an optical reading device provided in the carrier.
Figure 6:
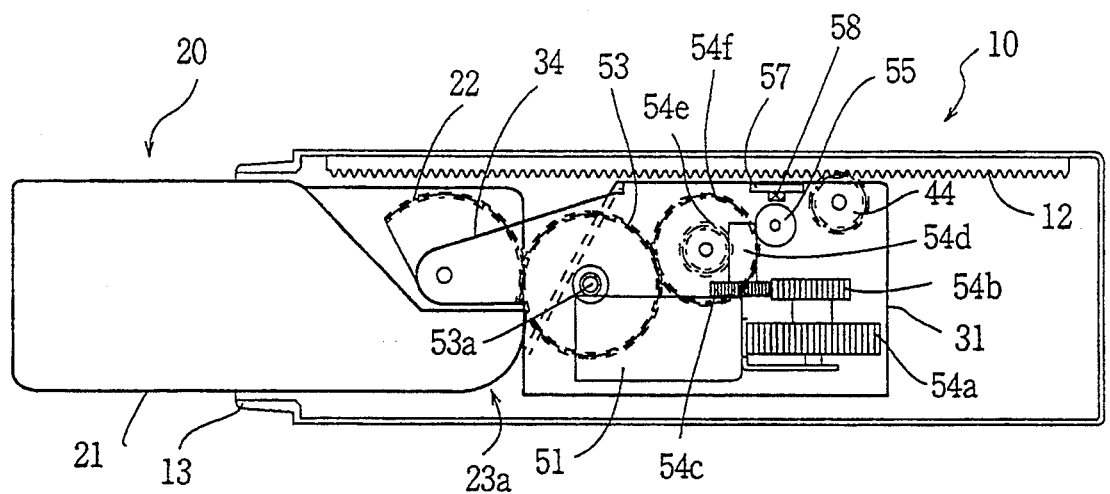
FIG. 6 is a side view of the television set and the carrier when partially projected out of a casing.

As shown in FIG. 4, the gear 54f of the rotating mechanism 50 meshes with a gear 55 mounted in an upper portion of the carrier 31. On the gear 55 is securely mounted an optical rotary wheel 56 having a black and white striped periphery as shown in FIG. 5. A photosensor 58 is mounted through a base 57 on the underside of the carrier 31 opposite the rotary wheel 56. The photosensor 58 emits a beam which is reflected on the periphery of the rotary wheel 56, thereby generating pulse signals. Hence, an angular disposition of the television set is detected.

The operation for positioning the television set 20 is described hereinafter with reference to FIGS. 6 to 9. When an ejector switch (not shown) is operated, the carrier driving motor 41 of the driving mechanism 40 is operated. The rotation of the rotary shaft of the motor 41 is transmitted to the pinion 43 through the gear train and further to the pinion 44 through the shaft 45. The pinions 43 and 44 travel on the racks 11 and 12, respectively, thereby moving the carrier 31 toward the opening 13 of the casing 10.

As the carrier 31 travels, the photosensor 70 detects the traveling length in accordance with the pulse signals caused by beams reflected on the optical tape 71.

Figure 7:
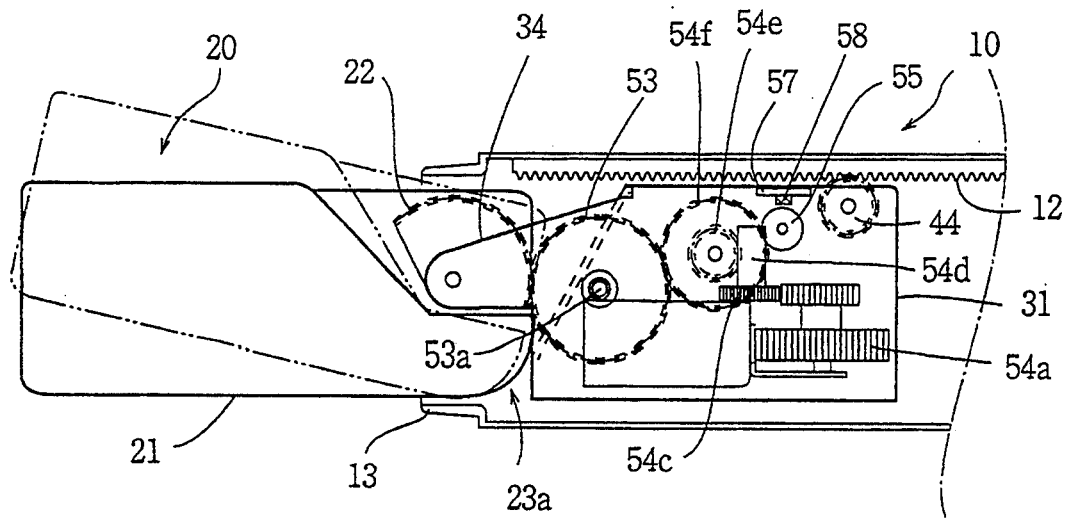
FIG. 7 is a side view of the television set and the carrier when the rotation of the television set is started.

When the carrier 31 reaches a position shown in FIG. 7, the sensing switch 46 is turned on by the projection on the carrier 31. At that position the television set 20 is not yet completely pushed out from the opening 13 of the casing 10, but the set can be rotated without contacting with the casing. Therefore, upon the actuation of the sensing switch 46, the television set rotating motor 51 of the rotating mechanism 50 is operated. The gears 53 are rotated through the gear train, so that the sector gears 22 and 23 are rotated to uphold the LCD device 21 as shown by the dash-dot line.

Figure 15:
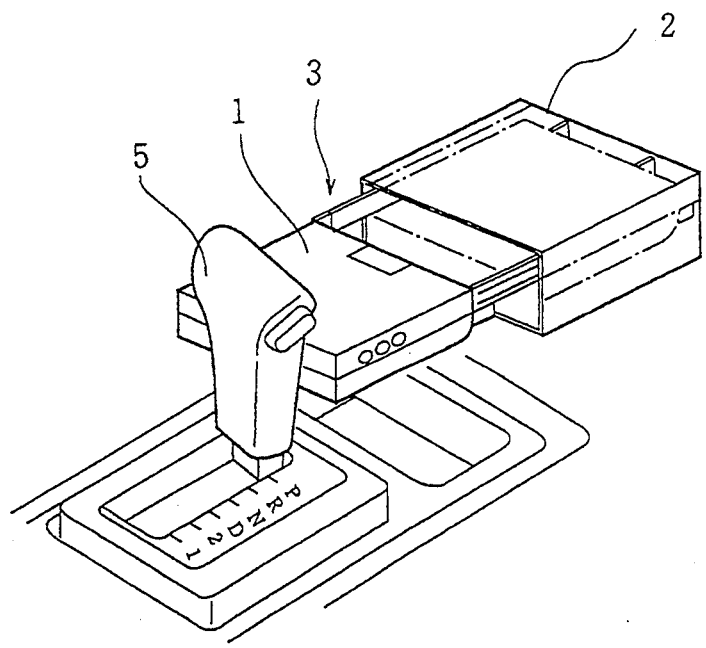
FIG. 15 is a perspective view of the conventional television set projected out of a casing thereof.
Figure 16:
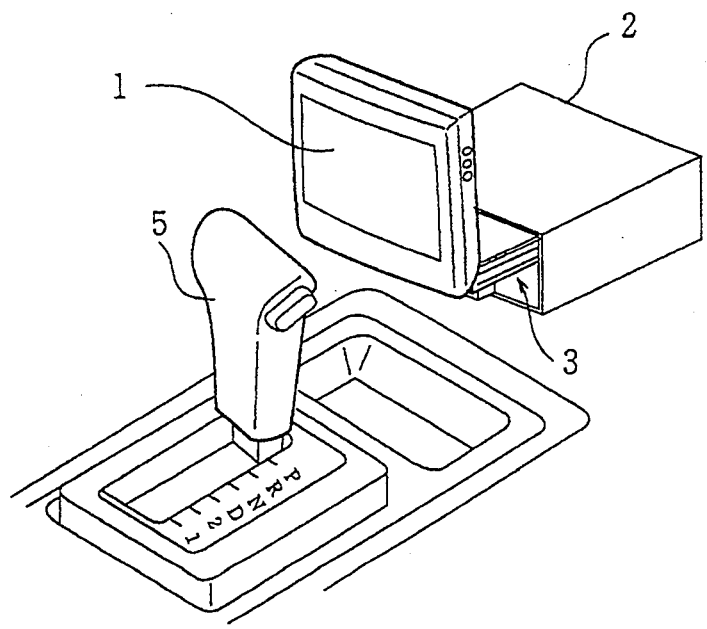
FIG. 16 is a perspective view of the conventional television set located in position in order to watch the television.

Since the rotation of the television set 20 starts before it is completely ejected out of the casing 10, the space necessary for the rotation is decreased. Therefore, even if a shift lever of the automobile is at a parking position adjacent the dashboard D as shown in FIGS. 15 and 16, the television set 20 does not bump against the shift lever. This is advantageous in that both the shift lever and the television set are prevented from being damaged, and that the driver need not shift the lever to another position and repeat the operation of the television set.

Since the rear edge 23a of the television set 20 is curved, the television set 20 is prevented from abutting against the casing 10 upon rotation. During the operation, the gear 55 meshed with the gear 54f of the gear train, and hence the optical wheel 56 are rotated in synchronism with the television set 20. Therefore, the photosensor 58 detects the rotating angle of the television set 20.

Figure 8:
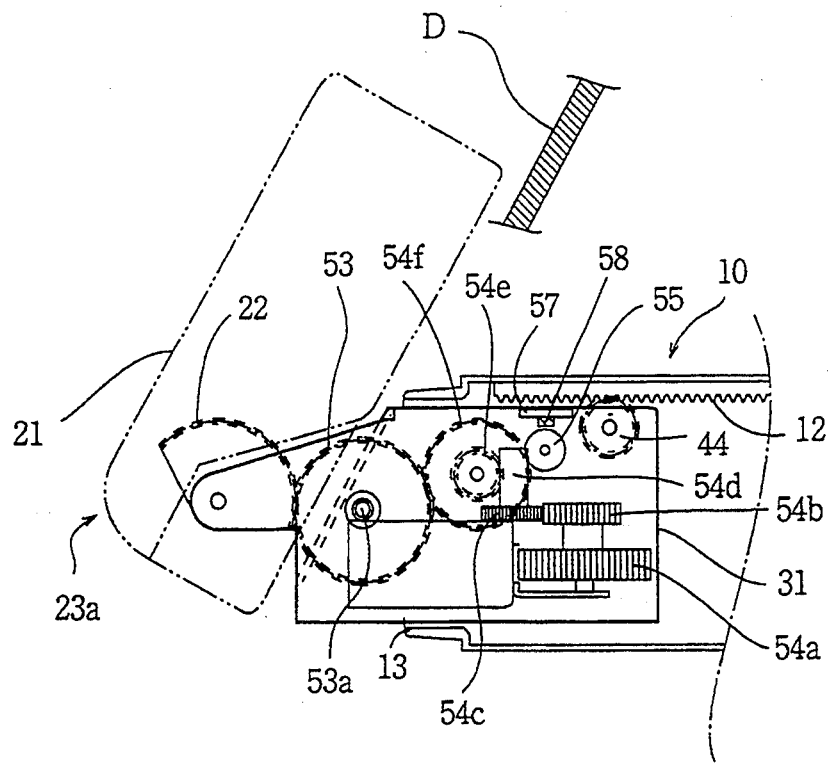
FIG. 8 is a side view of the television set and the carrier when the television set is rotated a predetermined angle.

When the photosensor 58 detects that the television set 20 is rotated a predetermined angle to a position shown in FIG. 8, the television set rotating motor 51 is stopped. Immediately before or after the television set 20 stops rotating, the photosensor 70 detects that the carrier 31 has moved a predetermined distance, thereby stopping the motor 41.

Figure 9:
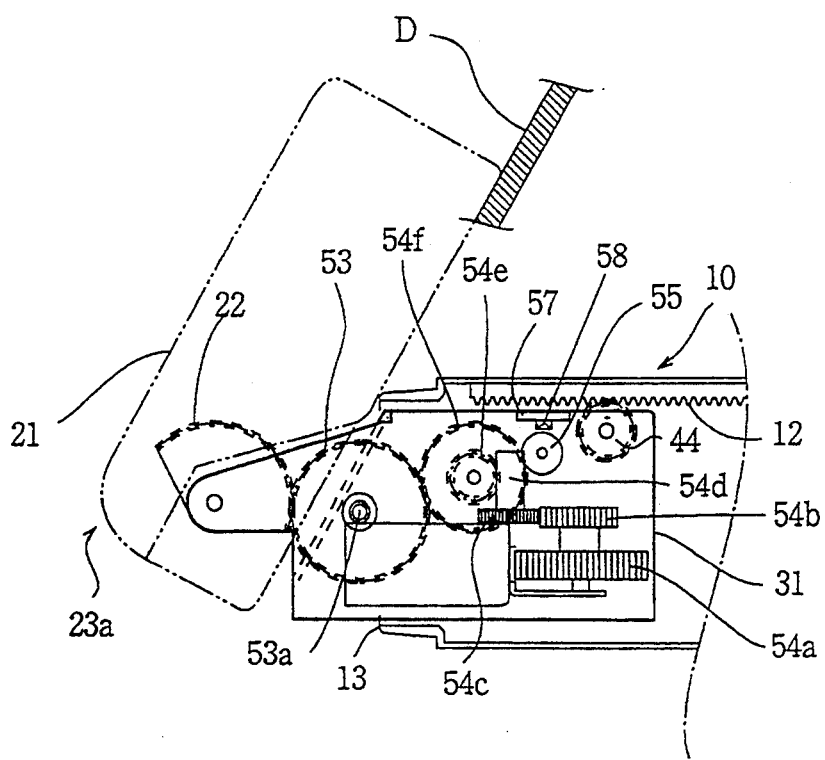
FIG. 9 is a side view of the television set and the carrier when the television set is abutted on a dashboard of an automobile.

Thereafter, the motor 41 is driven in the opposite direction, so that the carrier 31 is moved toward the casing 10. When the photosensor 70 detects that the carrier 31 has returned a predetermined quantity, the back of the television set 20 abuts against the dashboard D as shown in FIG. 9, and the motor 41 is stopped. If the motor shaft continues to rotate, the above described slipping mechanism operates.

Since the television set 20 is securely held by the dashboard D, the television set 20 is prevented from vibrating when the vehicle is driven. In addition, the push buttons on the front panel can be easily and exactly depressed without causing the entire television set to yield under the pressure.

When retracting the television set 20 in the casing 10, the television set rotating motor 51 is operated to reversely rotate the television set. Thereafter the carrier driving motor 41 is operated in the opposite direction.

The television set is returned to the horizontal position, and the motor 41 is kept driven until the photosensor 70 detects that the carrier 31 is moved a predetermined distance whereby the television set 20 is completely housed in the casing 10.

The operation of the system will be described with reference to FIGS. 10 to 13 in detail.

Figure 10:
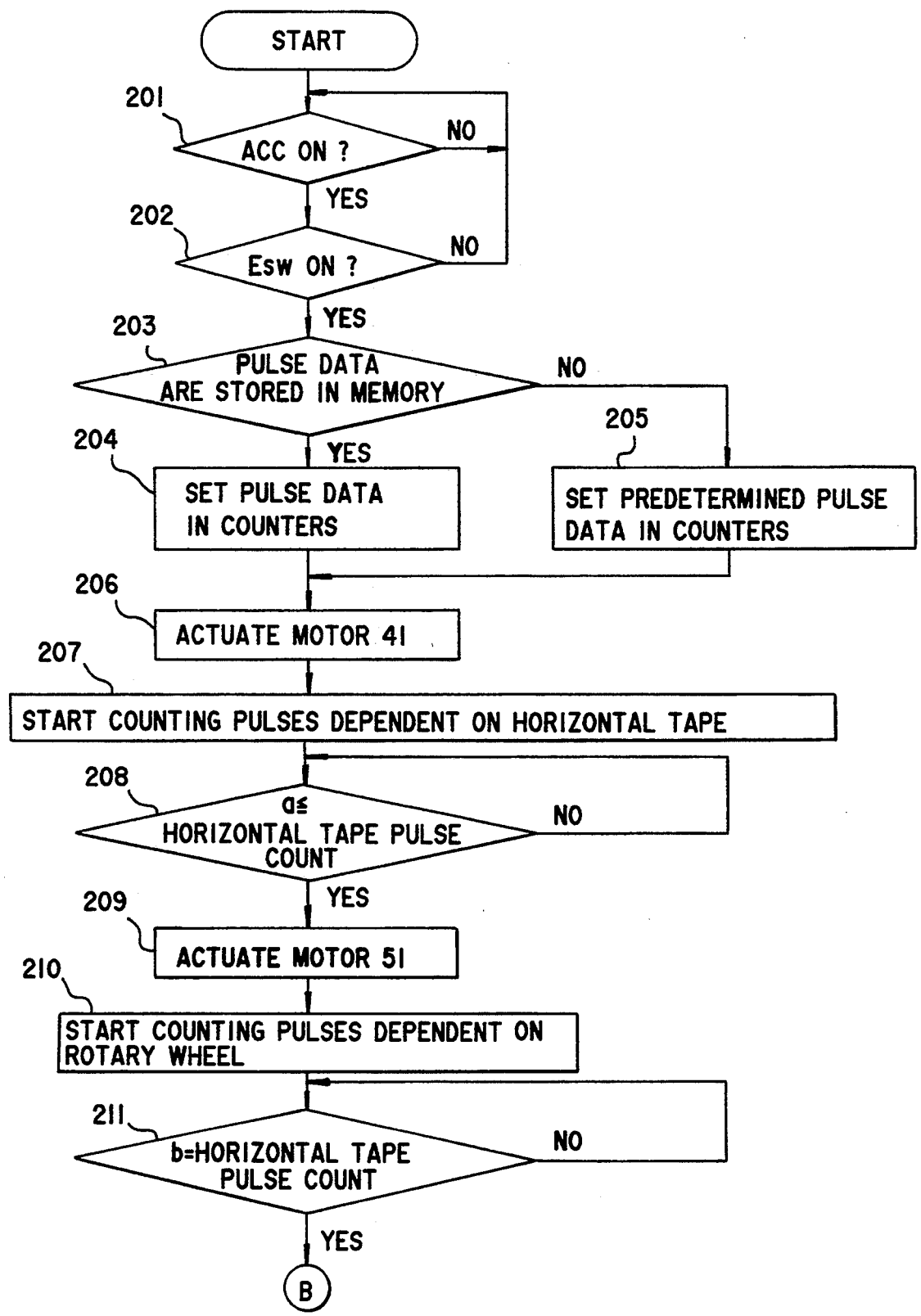
FIGS. 10 and 11 show a flowchart describing the operation for positioning the television set.
Figure 11:
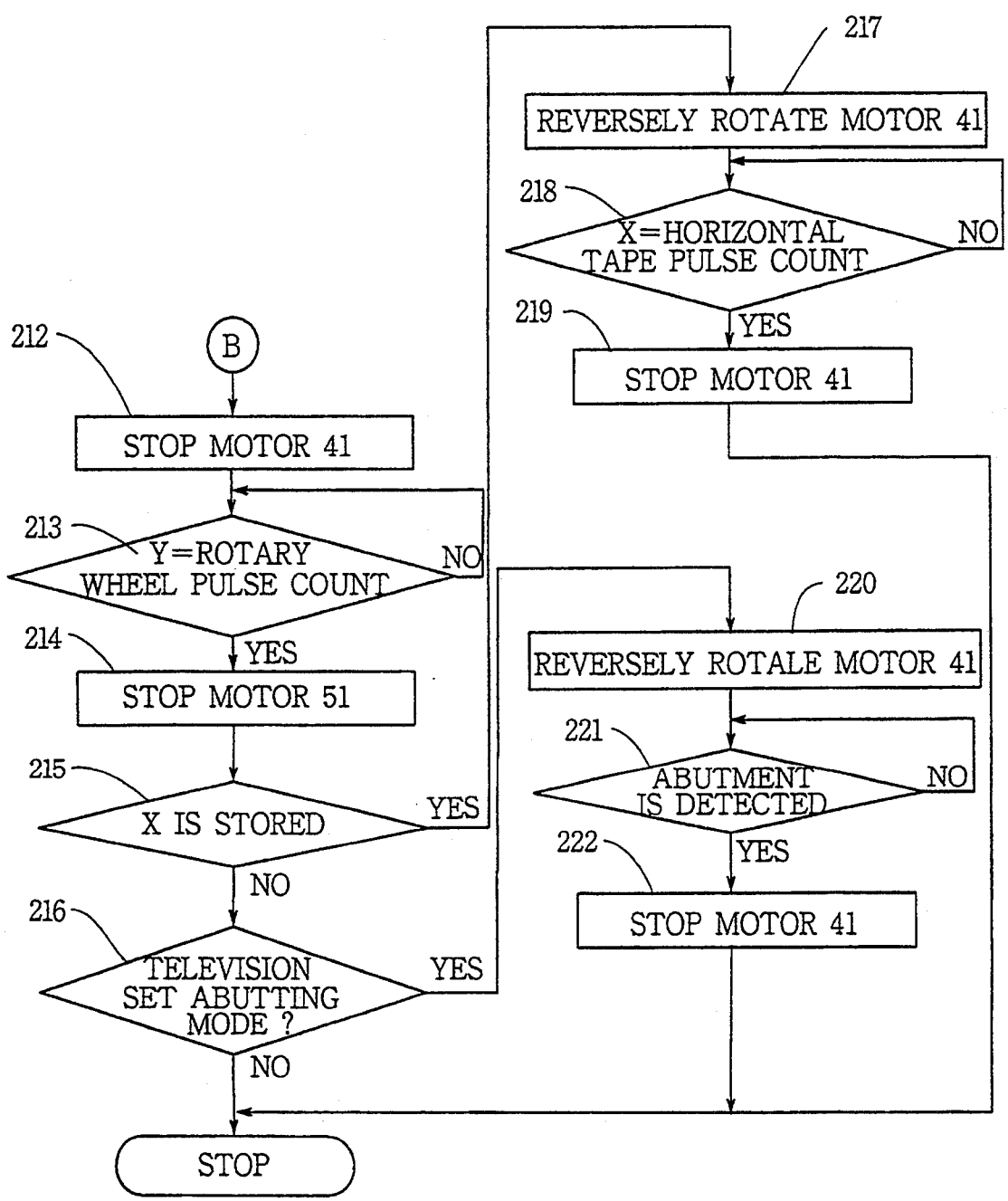

Referring to FIG. 10, the turning on of the accessory switch of the automobile is determined at a step 201, and the turning on of the ejector switch is determined at a step 202. At a step 203, it is determined whether data for the number of pulses for driving the motors 41 and 51 are stored in a pulse memory provided in the system. There are four sets of the number of pulses in the system. That is the number a of first pulses I for driving the carrier 31 from the retracted position to the rotation starting point, the number b of a second pulses II until the ejected position, the number X of third pulses III from the ejected position to the dashboard, and the number Y of fourth pulses IV for rotating the television set.

In the initial stage in the factory, no data for the pulses are stored in the pulse memory. Therefore, predetermined data for the first to forth pulses are stored in the pulse memory by the manufacturer. In the subsequent operation of the television set by the user, the data stored in the memory can be updated and selectively erased. The stored pulse data are set in counters provided in the system. In the actual operation by the user, the pulse data stored in the memory are derived and set in the counters at a step 204. Then, the carrier driving motor 41 is actuated (step 206) and the counting of the output pulses of the photosensor 70 dependent on the horizontal tape 71 is started at a step 207. When the count of the pulses becomes equal to or larger than the number a of the first pulses I, the rotating motor 51 is driven (step 209), and the counting of the output pulses of the photosensor 58 caused by the rotary wheel 56 is started at a step 210. When the count of the horizontal tape pulses becomes equal to the number b of the second pulses II at a step 211, the carrier driving motor 41 is stopped (step 212). When the count by the rotary wheel 56 becomes equal to the number Y of the fourth pulses IV (step 213), the rotating motor 51 is stopped at a step 214. At a step 215, it is determined whether the number is stored in the memory at the step 203. When the number X is stored, at a step 217, the carrier driving motor 41 is reversely rotated. When the count of the horizontal tape pulse becomes equal to the number X of the third pulses III (step 218), the motor 41 is stopped at a step 219.

When it is determined that the television set abutting mode is selected by the driver at a step 216, the program proceeds to a step 220 where the motor 41 is also reversely driven. When the television set is abutted against the dashboard, the output pulse of the photosensor 70 changes. At a step 221, the abutment of the television set is detected by the change of the output pulse. Thus, the television set is held on the dashboard.

Figure 12:
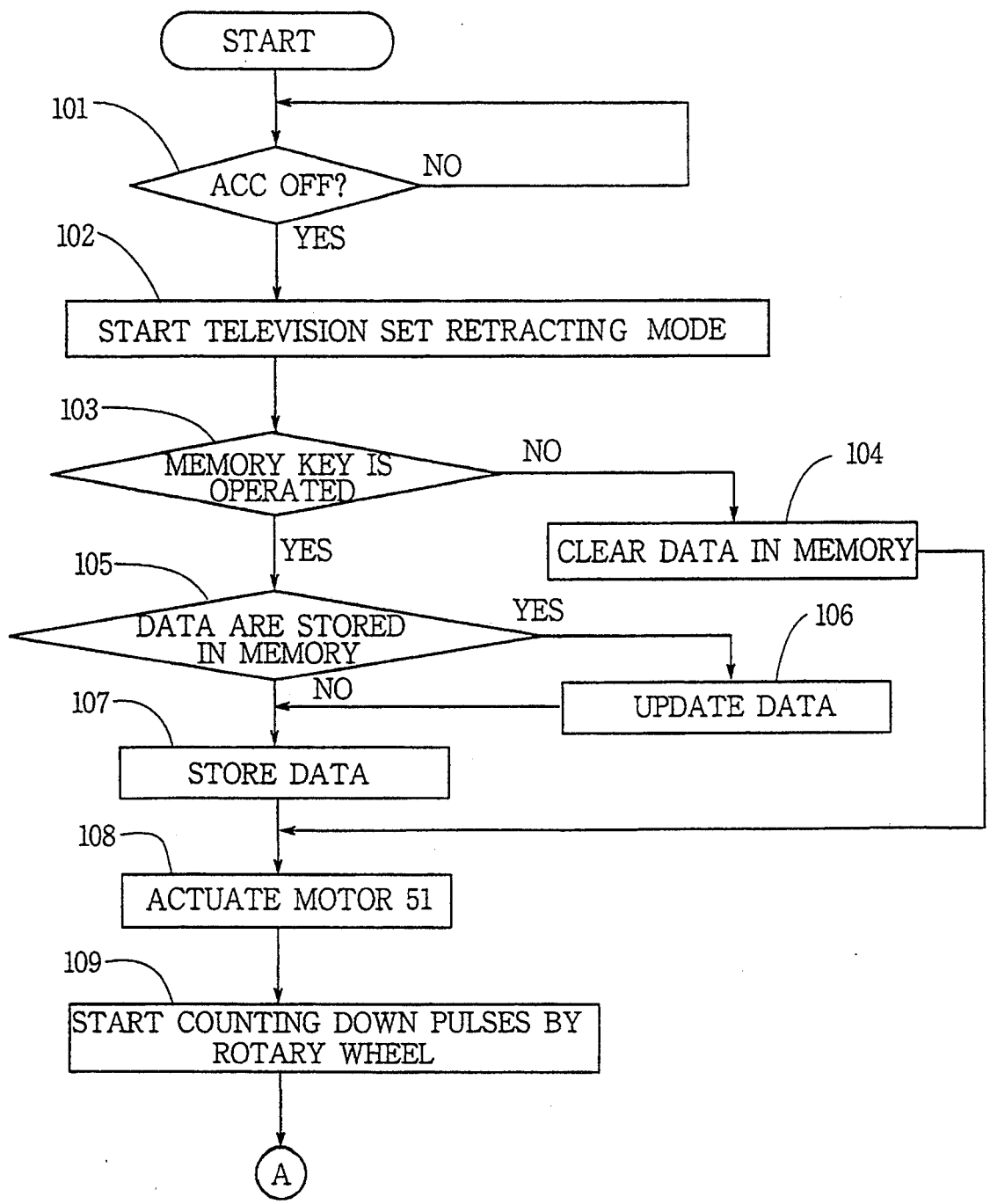
FIGS. 12 and 13 show a flowchart describing the operation for storing the television set when an ignition switch of the motor vehicle is turned off.
Figure 13:
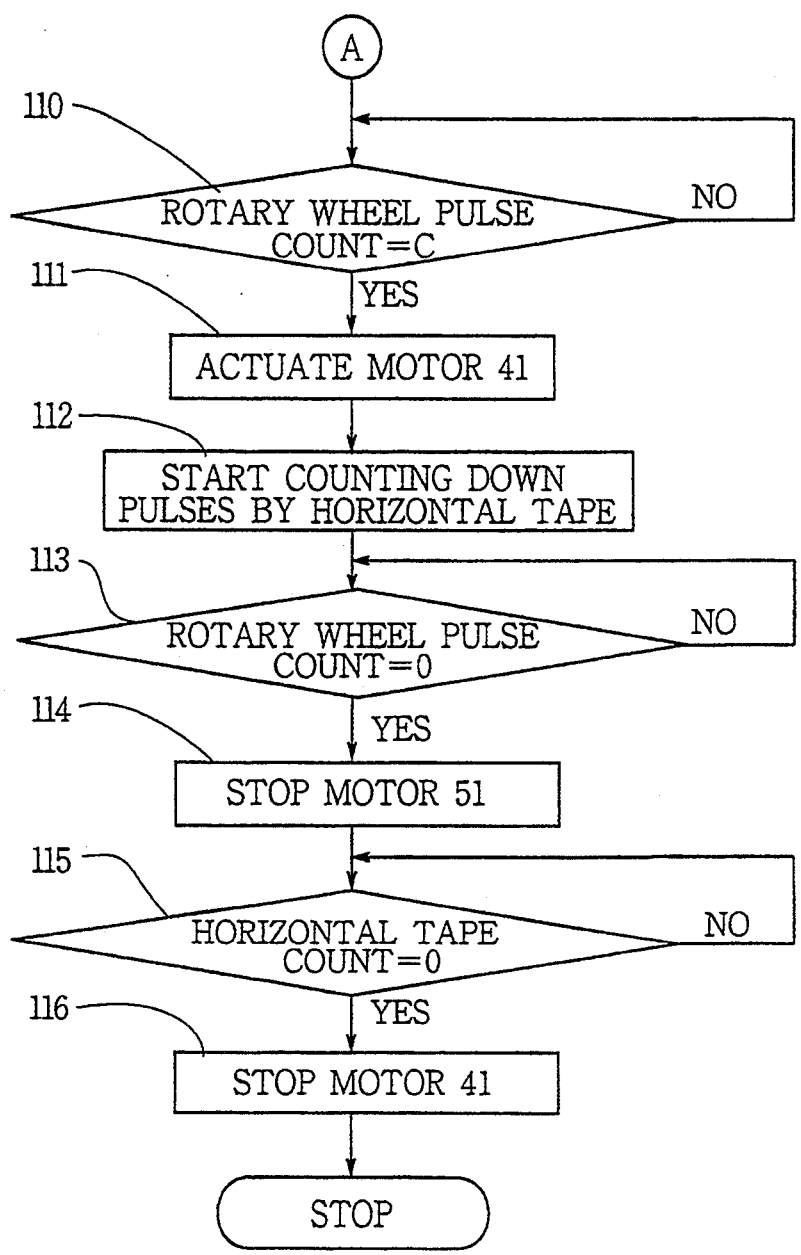
Figure 14:
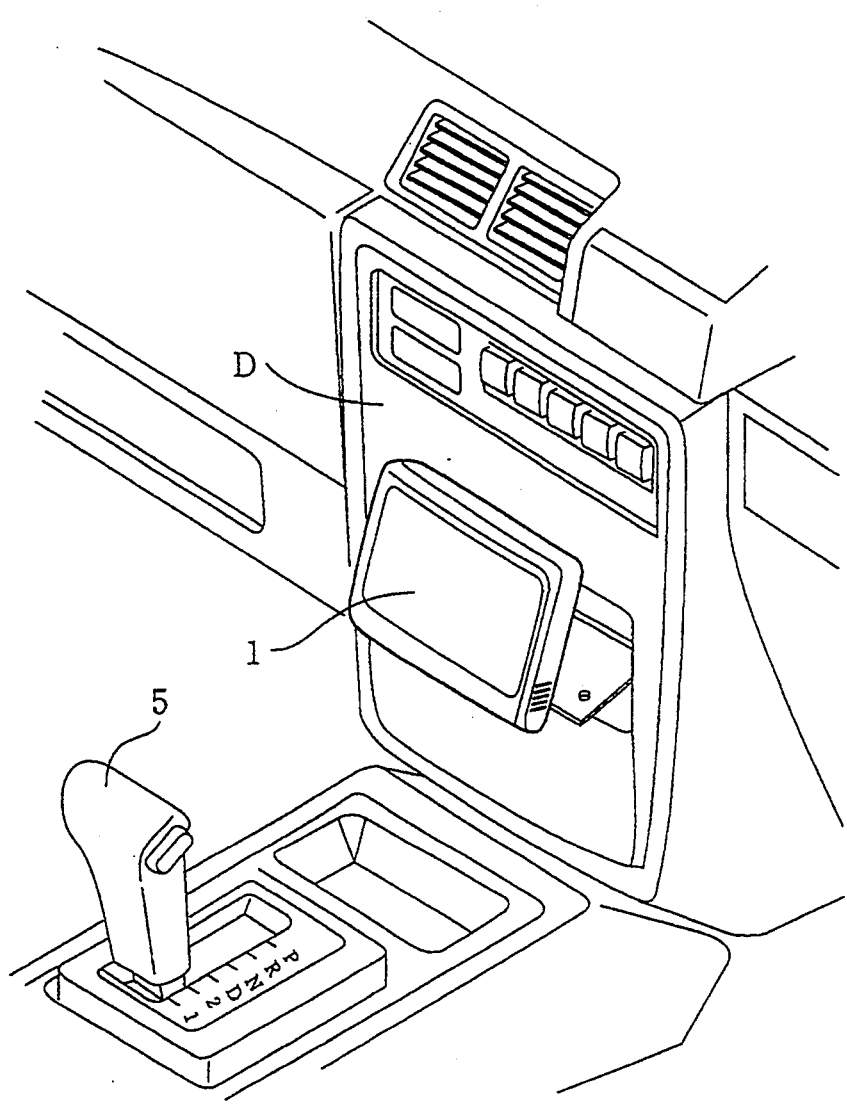
FIG. 14 is a perspective view of a conventional television set mounted on a dashboard of an automobile.

The retracting operation of the television set is described with reference to FIGS. 12 and 13. When the accessory switch of the automobile is turned off (step 101), the television set retracting mode is started (step 102).

In the system of the present invention, the angle of the television set, that is the number Y of the fourth pulses IV, can be adjusted by the user to a desired angle. Namely the data for the number Y in the memory can be changed by operating an adjust key (not shown). Furthermore, the adjusted angle stored in the memory can be used for the next use of the television set by operating a memory key (not shown).

At a step 103, it is determined whether the memory key is operated. When the memory key is not operated, the data stored in the memory in the last program are cleared. If the memory key is operated and data are stored in the last program, the data are updated at a step 106. New data are stored for the number Y at a step 107 for the next use. In the next use, the stored data for the number Y are set in the counter at the step 204.

At a step 108, the rotating motor 51 is reversely rotated, and the counting down of the number Y set in the counter is started (step 109). At a step 110, when the count of the rotary wheel pulses reaches a predetermined value c, the carrier driving motor 41 is reversely driven (step 111), and the counting down of the pulses dependent on the horizontal tape is started at a stop 112. When the rotary wheel pulse count becomes zero (step 113), the motor 51 is stopped. When the horizontal tape pulse count becomes zero (step 115), the motor 41 is stopped. Thus, the television set is housed in the casing 10.

Since the angle of the television set is automatically set at the desired angle stored in the memory, troublesome operation for adjusting the angle of the television set may be omitted in the subsequent operation.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for moving a television set mounted on a motor vehicle having an inside wall member, the system comprising:
    a casing having an opening and provided in an inside wall member of a motor vehicle;
    a carrier, slidably mounted in said casing, to be operatively movable toward said opening;
    supporting means, provided on said carrier, for pivotally mounting a television set at a front portion of said carrier;
    a television set rotating motor means for pivotally rotating the television set to at least one of a) a standing position for display and operation, and b) a downward position for being retracted and stored in said casing;
    a carrier driving motor means for driving said carrier in said casing to at least one of a) a forward position for allowing said standing position of the television set, and b) a retracted position for storing the television set in said downward position in said casing;
    first transmitting means, operatively located between said carrier and said carrier driving motor means, for transmitting output power of said carrier driving motor means to said carrier in order to drive said carrier;
    second transmitting means, operatively located between the television set and said television set rotating motor means, for transmitting output power of said television set rotating motor means to the television set for pivotally rotating the television set to at least one of the standing or downward positions;
    memory means for storing data about said positions of said carrier and about an angular position of the television set;
    manual television starting means for producing a start signal for starting operation of the system;
    control means, responsive to the start signal, for controlling said carrier driving motor means and said television set rotating motor means, by using the data about said positions stored in said memory means to move said carrier to at least one of the forward position and the retracted position in the casing, and to rotate the television set to at least one of the downward position and the standing position, such than when the television set is moved, it is moved between the downward position into said casing for storage and the standing position outside said casing during operation.

2. A system according to claim 1 wherein the said manual television starting means is an ejector switch.

3. A system according to claim 1 wherein
    the memory means has means for selectively storing the standing position, and
    the control means has means for rotating the television set to the stored standing position.

4. A system according to claim 1 wherein
    the control means has means responsive to turning off of an accessory switch of the motor vehicle for moving the television set from the standing position to the retracted position.

5. A system according to claim 1 wherein
    the control means has means for reversely moving the carrier from the forward position to a backward position in which a back of the television set abuts against a portion of the inside wall member of the motor vehicle upon which the television set is mounted.

6. A system according to claim 1 wherein
    the control means has means for starting rotating the television set to the standing position before the carrier reaches the forward position.

7. A system according to claim 1 further comprising optical sensing means for detecting moving distance of the television set, the control means for controlling the moving of the carrier and the television set in accordance with a detected moving distance.

* * * * *